United States Patent [19]

Rensland et al.

[11] 4,135,836
[45] Jan. 23, 1979

[54] CHAIR BACK WITH POLYMER SPRING

[75] Inventors: Thomas E. Rensland; Alexander A. Karrip, both of Grand Rapids, Mich.

[73] Assignee: Steelcase Inc., Grand Rapids, Mich.

[21] Appl. No.: 855,967

[22] Filed: Nov. 30, 1977

[51] Int. Cl.² ........................ F16C 11/00; F16D 1/12
[52] U.S. Cl. .................................... 403/120; 297/291; 267/150
[58] Field of Search ............... 403/111, 220, 119, 120, 403/149; 297/291; 267/153

[56] References Cited

U.S. PATENT DOCUMENTS

| 2,732,003 | 1/1956  | Corning  | 403/220 X |
| 2,796,920 | 6/1957  | Cowles   | 297/291   |
| 3,856,325 | 12/1974 | Willetts | 403/120 X |
| 3,934,930 | 1/1976  | Sandham  | 297/291   |
| 4,043,592 | 8/1977  | Fries    | 297/291   |

FOREIGN PATENT DOCUMENTS 589731  6/1947  United Kingdom ..................... 297/291

Primary Examiner—Wayne L. Shedd
Attorney, Agent, or Firm—Price, Heneveld, Huizenga & Cooper

[57] ABSTRACT

A chair back mounted on a chair back support plate is pivotally connected by a resilient arrangement to a housing slideably mounted on a vertical post. The resilient arrangement includes a member of a resilient material with ends, each end having enlarged heads with an opening extending through the heads and a pivot groove positioned between the enlarged heads. Upon application of an external force, the chair back pivots about the groove and compresses the enlarged heads thereby closing the opening through the enlarged heads.

12 Claims, 5 Drawing Figures

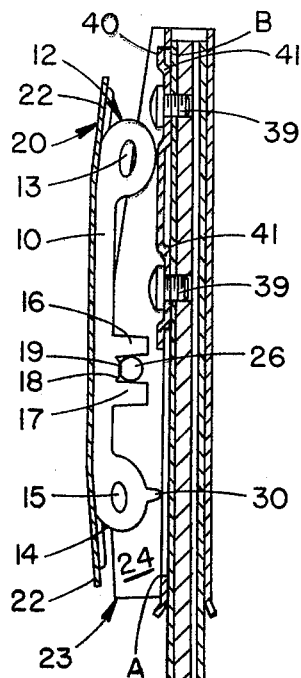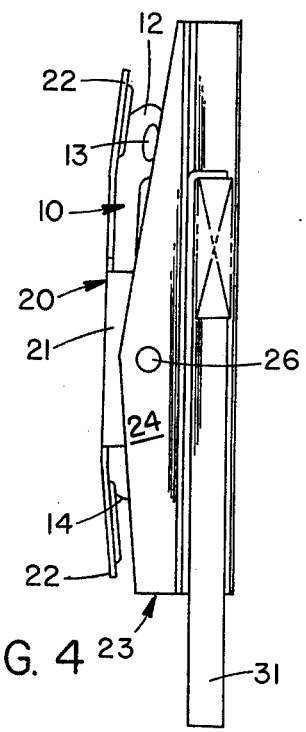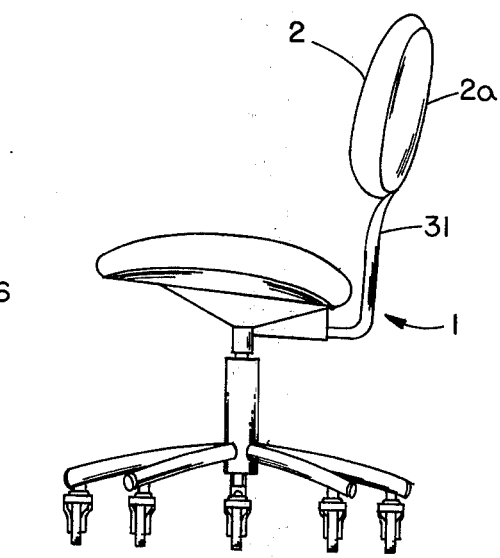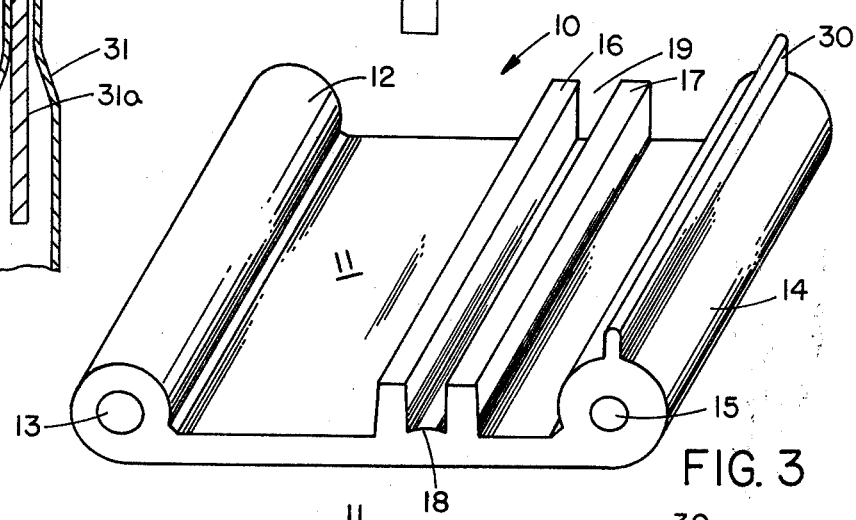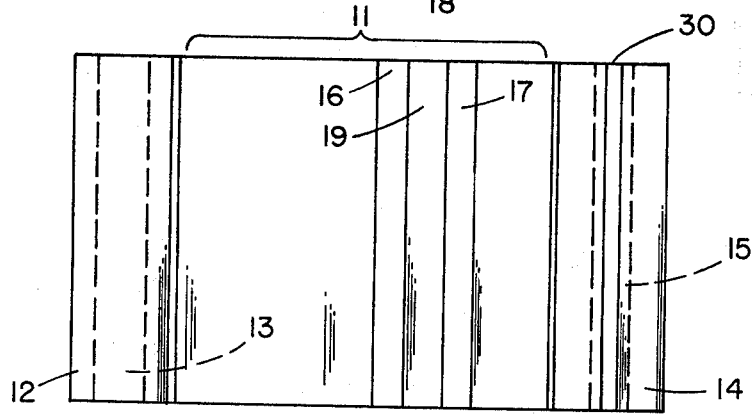

CHAIR BACK WITH POLYMER SPRING

BACKGROUND OF THE INVENTION (1) Field of the Invention

This invention relates to chairs; and, more particularly, to chairs having two parts relatively movable with respect to each other.

(2) Prior Art

A secretarial posture chair generally includes a back rest portion secured to the seat and legs of the chair by a vertically oriented upright post. The back rest portion of such chairs is dimensioned so as to support the small of the back of a person sitting in the chair. In order to permit the chair to be usable by different persons, the back rests of such posture chairs are typically vertically adjustable. In some prior art chairs, the back rest is mounted so as to pivot along its horizontal axis relative to the vertical support post. As a result, the back rest can be vertically adjusted to fit different people using the chair, and the back rest can pivot so the top edge of the back rest does not uncomfortably impinge on the user's back.

Chairs are known employing an external, clearly visible mechanism which permits limited pivotal movement along the horizontal axis of the back rest. Such a mechanism is unsightly and does not adapt to modern furniture design. Later versions of such posture chairs include enclosed, adjusting mechanisms with the capability of limited horizontal pivotal movement. An example of such an arrangement is found in U.S. Pat. No. 4,043,592 to Bernard J. Fries entitled ADJUSTABLE SEAT BACK MECHANISM, issued Aug. 23, 1977. The patent teaches an embodiment wherein a housing slidably mounted on the vertical post is secured to a back rest support plate by a pair of bolts which pass through a pair of resilient blocks. Compression of the resilient blocks permits pivoting of the housing relative to the support plate. In another embodiment, a spring assembly including a spring support plate and a leaf spring is disposed between the housing and the support plate. A pivot pin then passes transversely through the support plate, the spring support plate, and the housing to pivotally interconnect the elements.

The use of a pair of resilient blocks is disadvantageous because each block must be separately mounted and properly aligned with both the vertical support and the pivoting back member so that both of the two members properly engage the resilient blocks. The use of a spring is disadvantageous because the spring typically is expensive. Further, metal springs may cause excessive and rapid wear of engaging parts and produce an undesirable rubbing or squeaking noise. As a result, while rubber blocks may be relatively inexpensive they are difficult to install and position properly; and, fabricating a spring and installing it produces an undesirable large expense. It is particularly significant to appreciate that when a great number of chairs are made, even a small saving in cost of one part in a chair can result in a substantial total saving and that even a small improvement in the ease of fabrication can result in the substantial overall improvement in fabrication.

SUMMARY OF THE INVENTION

In accordance with the present invention, an improved spring means for controlling movement of one member of a chair with respect to another member of the chair is provided by a resilient polymer member having a pair of enlarged ends each of which has an opening therethrough, and a pivot axis receiving means positioned intermediate the ends for receiving a pivot axis means. The back of the chair pivots by deforming the resilient material and allowing the openings to close. Thus the seat back has a range of pivotal back travel best suited for occupant comfort. When no external force is applied, the chair back is biased to a neutral position.

The material of such a spring can be a relatively inexpensive resilient polymer which can be easily molded into a desired shape. Thus, the required manufacturing step can be simple and inexpensive. Further, the positioning of the spring is readily done by aligning the groove on the pivot pin within the chair back. With the groove properly positioned, the enlarged ends which deflect in response to an applied force are properly positioned between the two relatively movable members of the chair. Thus the spring means of this invention simultaneously achieves reduced cost, easier installation, and simplified fabrication.

BRIEF DESCRIPTION OF THE DRAWINGS

FIG. 1 is a side elevation view and partial cross-section of the back pivot mechanism including a resilient spring in accordance with an embodiment of this invention;

FIG. 2 is an elevation view of a spring in accordance with an embodiment of this invention;

FIG. 3 is a perspective view of a spring in accordance with an embodiment of this invention;

FIG. 4 is a side elevation view of the back pivot mechanism showing the relative coupling of the two members of the back and the position of a spring in accordance with an embodiment of this invention; and FIG. 5 is a side elevation of a typical secretarial chair.

DETAILED DESCRIPTION OF THE PREFERRED EMBODIMENT

Referring to FIG. 1, a spring 10 is shown mounted in a pivotable seat back. Spring 10 is made of a resilient material and is positioned between a chair back support plate 20 and a movable housing 23 which is slideably mounted on vertical post 31 so that a force applied to chair back support plate 20 permits plate 20 to pivot. That is, plate 20 supports, for example, an upholstered chair back (not shown) against which a force from a user's back is applied.

Referring to FIGS. 2 and 3, spring 10 is bounded by a generally rectangular outline and includes a generally planar body 11. Body 11 is generally rectangular and has extending along the top width thereof a top cylinder 12 with an axial opening 13 therethrough. A bottom cylinder 14 extends along the bottom width of body 11 and has extending therethrough a bottom axial opening 15. Intermediate top cylinder 12 and bottom cylinder 14 is a top flange 16 spaced from a bottom flange 17 defining therebetween a groove 19. The bottom of groove 19, corresponding to the face of body 11, includes a ridge 18 having a generally convex face for minimizing friction against a pivot pin or axle 26 positioned in groove 19 (FIG. 1). The outer surfaces of cylinders 12 and 14 are tangent to a major surface of body 11. Cylinders 12 and 14 extend outwardly from body 11 in the same directon as flanges 16 and 17. As a result, a major surface of body 11 and cylinders 12 and 14 can all rest against a face of chair back support plate 20 and spring 10 can pivot without twisting of body 11 which could undesirably change the relative position of cylinders 12 and 14 and groove 19.

Referring to FIGS. 1, 2 and 3, bottom cylinder 14 has longitudinally extending therealong an extender 30 projecting from the outer surface of bottom cylinder 14. Extender 30 is an elongated ridge which extends outwardly in the direction toward which groove 19 opens and serves to extend the dimension of the lower portion of spring 10 so that, in a neutral or unbiased position, the bottom portion of spring 10 extends between adjacent portions of chair back adapter 20 and back retainer 23. That is, the spring force offered by bottom cylinder 14, as well as, of course, top cylinder 12, can be determined by the material of spring 10, and the relative diameters of the cylinder and the axial opening within the cylinder. If the desired spring force can be achieved without the outer diameter of the cylinder having a sufficiently large dimension to space chair back support plate 20 from housing 23, extender 30 can be used to provide such a sufficiently large dimension without requiring the entire cylinder to be enlarged. This results in a saving of material and reduces cost.

Chair back support plate 20 is a generally flat piece of metal with angled top and bottom ends 22 (FIGS. 1 and 4) having openings (not shown) therethrough for receiving screws and mounting a chair back thereto. Side flanges 21 (FIG. 4) extend at about a 90° angle from the generally flat piece at each side of chair back adapter 20 toward the back of the chair. Each of side flanges 21 has an opening therethrough for receiving pivot pin or axle 26 about which chair back adapter 20, and consequently, the chair back pivots. Back housing 23 is mounted on a tubular upright 31 which has a flattened upper portion to which is coupled a housing retainer 40 by such means as screws 39 (FIG. 1). As with back support plate 20, back housing 23 has a pair of side flanges 24 extending from the sides thereof and generally forwardly. Also, there are openings through side flanges 24 for receiving pivot pin or axle 26. Side flanges 21 of chair back support plate 20 are spaced somewhat closer together than retainer side flanges 24 so that flanges 21 can be positioned within flanges 24. The openings through flanges 21 and 24 are aligned with respect to each other and pass pivot pin 26.

A typical material for spring 10 is polyvinyl chloride with 400% ultimate elongation, a 62 ± 3 "A" scale durometer, an ultimate tensile strength of 1100 psi, and a 100% modulus of 600 psi. Typical dimensions for spring 10 include: a length of 4 and 1/32", a width of 2 and ¼", a diameter of 11/32" for top axial opening 13, a radius of 21/64" for top cylinder 12, a diameter of ¼" for bottom axial opening 15, a radius of 23/64" for bottom cylinder 14 and a thickness of 13/64" for body 11. A typical width for each of flanges 16 and 17 is ¼" with a spacing of ¼" therebetween. A typical spacing of the uppermost edge of bottom flange 17 from the lowermost extremity of bottom cylinder 14 is about 1 and 17/32".

Advantageously, in accordance with an embodiment of this invention, cylinders 12 and 14 and openings 15 and 13 are not perfectly round but are elongated in the direction of the longitudinal axis of body 11. That is, the dimensions given above are the greater dimensions for openings 13 and 15 parallel to the longitudinal axis of body 11. The diameter of top axial opening 13 in a direction perpendicular to a major face of body 11 is about 9/32" and the diameter of bottom axial opening 15 in a direction perpendicular to a major face of body 11 is about 7/32". The corresponding dimension for top cylinder 12 is 0.66". The dimension from the extremity of extender 30 to the other side of bottom cylinder 14 is about 0.910".

The dimensions establishing the relative position of bottom and top cylinders 14 and 12 with respect to groove 19 are important because each of cylinders 12 and 14 must be properly positioned between chair back support plate 20 and housing 23. Further, the positioning of cylinders 12 and 14 with respect to the pivot point determines the amount of resisting force that the cylinders apply to the pivotal movement of chair back support plate 20. That is, as is known, a given spring force produces a greater resisting torque with a longer moment arm than a shorter moment arm. In this case the length of the moment arm is the distance from the pivot point to the point of application of the force.

The dimensions establishing the size of the cylinders and the axial openings therein are important in a given chair design because they partially determine the amount of pivotal adjustment of the chair back and the amount of external force necessary to cause pivotal movement of the chair back.

If desired, top and bottom flanges 16 and 17 can extend toward each other thereby closing off the rearwardly open side of groove 19 and forming an elongated tubular opening. That is, pivot pin 26 would then be slid down this tubular opening to secure spring 10 to the chair. However, such a tubular opening presents additional complication in molding spring 10 and uses additional material. Neither the expense of the additional complication in molding nor the expense of using additional material is desirable.

INSTALLATION AND OPERATION

Spring 10 is positioned within the chair by first sliding housing 23 over the upper portion of tubular upright 31 so that side flanges 24 extend forward. The specific means for mounting housing 23 on upright 31 forms no part of this invention. However, as shown, housing 23 includes a slot in its frontpiece extending from points A to B in FIG. 1. A retainer plate 40 is fitted over housing 23 with its embosses 41 lying in groove A-B. Screws 39 are then threaded into upright 31 (specifically into a reinforcing bar 31a). Housing 23 will now slide up and down to the extent of groove A-B and can be located at different heights by a known adjustment means such as that disclosed in the aforementioned U.S. Pat. No. 4,043,592 or the arrangement disclosed in U.S. Pat. No. 3,295,888, invented by Larry L. Poland, issued Jan. 3, 1967.

Spring 10 is placed on housing 23 with groove 19 aligned with the pin apertures in flanges 24. Chair back support plate 20 and side flanges 21 of chair back support plate 20 are aligned within retainer side flanges 24 so that pivot pin 26 can extend through the openings in flanges 21 and 24 and extend through the groove 19. Typically, after chair back support plate 20 is attached to back retainer 23 and spring 10 is in place, the chair back 2 itself, which supports the back of a chair occupant, is attached to chair back support plate 20. A cover 2a may be used to conceal the entire mechanism.

When an occupant sits in the chair 1 (FIG. 5), his back applies external force to the chair back 2 and in turn to chair back support plate 20. When this force is offset from pivot pin 26, the force tends to cause pivoting or rotation of chair back support plate 20 about pivot pin 26. The material of spring 10 deflects as a function of the material itself, the thickness of the wall of the top and bottom cylinders 12 and 14 and the diameter of the axial openings 13 and 15. Chair back support plate 20 can pivot so the angle of the chair back 2 conforms to the angle of the back of the occupant of the chair. When there is no external force, such as when there is no occupant in the chair, spring 10 positions chair back adapter 20, and therefore the chair back, in a neutral or unpivoted position, which is generally vertical.

Various modifications and variations will no doubt occur to those skilled in the art to which this invention pertains. For example, the relative position of groove 19 with respect to the two end cylinders of the spring would depend upon the particular brackets which support the chair back and are attached to the tubular upright of the chair. Similarly, back support plate 20 could be an integral part of back 2. These and all other variations which basically rely on the teaching through which this disclosure has advanced the art are properly considered within the scope of this invention as defined by the appended claims.

The embodiments of the invention in which an exclusive property or privilege is claimed are defined as follows.

1. In a chair with two members movable relative to each other about pivot axis means, spring means for controlling movement of one of said members with respect to another of said members, said spring means including:
   a resilient polymer member having a body with a pair of enlarged ends, and pivot receiving means intermediate said ends for receiving said pivot axis means, each of said enlarged ends having an opening extending therethrough; and
   said spring means being positioned between said two movable members with said pivot axis means located in said pivot receiving means so that upon application of an external force causing relative rotation between said two members, said resilient polymer member deforms allowing said openings to close and permitting a range of pivotal movement between said two members about said pivot axis means, and in the absence of an external force said two members being positioned at a neutral position relative to one another by the force applied by said resilient polymer member to said two members.

2. The chair of claim 1 in which said pivot receiving means comprises a groove in said resilient polymer member into which said pivot axis means is received.

3. The chair of claim 2 in which said groove comprises a pair of spaced parallel flanges projecting from one side of said body of said resilient polymer member.

4. The chair of claim 3 in which the bottom of said groove comprises a generally convex faced ridge for engaging said pivot axis means and minimizing friction therewith.

5. The chair of claim 3 in which said enlarged ends of said resilient polymer member project from said body in the same direction and said groove flanges project from said body in the same direction as said enlarged ends whereby one surface of said resilient polymer member is generally smooth and fits directly against one of said movable members whereby twisting of said body itself is eliminated when said movable members are moved relative to one another.

6. The chair, as recited in claim 5 wherein:
   each of said enlarged ends has an elongated, generally cylindrical shape with an axial hollow core, the radial wall thickness of said cylindrical enlarged end and the diameter of said hollow core being related to one another so as to give a desired degree of resilience.

7. The chair as recited in claim 6 wherein said spring means is molded of polyvinyl chloride with an ultimate elongation of about 400% and about a 62 "A" scale durameter hardness.

8. The chair of claim 2 in which the bottom of said groove comprises a generally convex faced ridge for engaging said pivot axis means and minimizing friction therewith.

9. The chair as recited in claim 2 wherein said spring means is molded of polyvinyl chloride with an ultimate elongation of about 400% and about a 62 "A" scale durameter hardness.

10. The chair of claim 1 in which said enlarged ends of said resilient polymer member project from said body in the same direction whereby one surface of said resilient polymer member is generally smooth and fits directly against one of said movable members whereby twisting of said body itself is eliminated when said movable members are moved relative to one another.

11. The chair, as recited in claim 1 wherein:
   each of said enlarged ends has an elongated, generally cylindrical shape with an axial hollow core, the radial wall thickness of said cylindrical enlarged end and the diameter of said hollow core being related to one another so as to give a desired degree of resilience.

12. The chair as recited in claim 2 wherein at least a portion of the outer surface of said cylindrical end is substantially tangent to one major surface of said body and said cylindrical ends extend outwardly from said body in the same direction whereby one surface of said resilient polymer member is generally smooth and fits directly against one of said movable members, whereby twisting of said body itself is eliminated when said movable members are moved relative to one another.

* * * * *